United States Patent
Kume

(10) Patent No.: US 12,492,733 B2
(45) Date of Patent: Dec. 9, 2025

(54) SLIDING BUSHING

(71) Applicant: Sumitomo Riko Company Limited, Aichi (JP)

(72) Inventor: Takashi Kume, Aichi (JP)

(73) Assignee: Sumitomo Riko Company Limited, Aichi (JP)

( * ) Notice: Subject to any disclaimer, the term of this patent is extended or adjusted under 35 U.S.C. 154(b) by 411 days.

(21) Appl. No.: 17/982,527

(22) Filed: Nov. 8, 2022

(65) Prior Publication Data

US 2023/0067436 A1 Mar. 2, 2023

Related U.S. Application Data

(63) Continuation of application No. PCT/JP2022/003276, filed on Jan. 28, 2022.

(30) Foreign Application Priority Data

Mar. 31, 2021 (JP) ................................. 2021-059572

(51) Int. Cl.
*F16F 1/38* (2006.01)
*F16F 1/387* (2006.01)

(52) U.S. Cl.
CPC ............ *F16F 1/3835* (2013.01); *F16F 1/387* (2013.01); *F16F 2224/025* (2013.01)

(58) Field of Classification Search
CPC .................................. F16F 1/3835; F16F 1/393
See application file for complete search history.

(56) References Cited

U.S. PATENT DOCUMENTS

| 3,194,614 | A | | 7/1965 | Thomas |
| 5,080,334 | A | | 1/1992 | Mihara et al. |
| 5,820,115 | A | * | 10/1998 | Stevenson ............ F16C 27/063 |
| | | | | 267/293 |

(Continued)

FOREIGN PATENT DOCUMENTS

| DE | 3536283 A1 | * | 4/1987 |
| DE | 4104949 | | 8/1991 |

(Continued)

OTHER PUBLICATIONS

"Office Action of German Counterpart Application", issued on Jan. 11, 2024, with English translation thereof, p. 1- p. 14.

(Continued)

*Primary Examiner* — Melody M Burch
(74) *Attorney, Agent, or Firm* — JCIPRNET

(57) ABSTRACT

Provided is a sliding bushing in which sliding of an inner shaft member with respect to a main rubber elastic body is allowed. The inner shaft member includes a bulge part provided midway in an axial direction. A braided cloth-like sliding liner is arranged between the inner shaft member and the main rubber elastic body so as to be non-adhesive and slidable with respect to the inner shaft member. In a portion of the sliding liner arranged on an outer periphery with respect to a large diameter part of the bulge part of the inner shaft member, a coarse part is provided of coarser braid mesh than a portion of the sliding liner arranged on an outer periphery with respect to a small diameter part on both axial sides of the large diameter part.

8 Claims, 6 Drawing Sheets

(56) References Cited

U.S. PATENT DOCUMENTS

| | | | |
|---|---|---|---|
| 2009/0224220 A1* | 9/2009 | Jordan | H02G 1/081 254/134.3 R |
| 2011/0116731 A1* | 5/2011 | McLaughlin | F16F 1/393 384/153 |
| 2015/0247543 A1 | 9/2015 | Kuki et al. | |

FOREIGN PATENT DOCUMENTS

| | | |
|---|---|---|
| DE | 4428870 | 11/1995 |
| DE | 112014003031 | 3/2016 |
| EP | 0351689 A1 * | 1/1990 |
| JP | 3628340 | 3/2005 |
| JP | 2010159860 | 7/2010 |
| JP | 2013133855 | 7/2013 |
| WO | 2013099408 | 7/2013 |
| WO | WO-2014003290 A1 * | 1/2014 ............. B60G 7/005 |

OTHER PUBLICATIONS

"Office Action of China Counterpart Application", issued on May 26, 2025, with English translation thereof, p. 1-p. 17.

* cited by examiner

SLIDING BUSHING

CROSS-REFERENCE TO RELATED APPLICATION

This application is a continuation of PCT International Application No. PCT/JP2022/003276, filed on Jan. 28, 2022, which claims priority under 35 U.S.C § 119(a) to Japanese Patent Application No. 2021-059572, filed on Mar. 31, 2021. Each of the above application(s) is hereby expressly incorporated by reference, in its entirety, into the present application.

BACKGROUND

Technical Field

The disclosure relates to a bushing used for, for example, a suspension bushing for an automobile or the like, and particularly relates to a sliding bushing in which sliding of an inner shaft member with respect to a main rubber elastic body is allowed.

Related Art

Conventionally, there is known a bushing used for a suspension bushing of an automobile or the like, as disclosed in, for example, Japanese Patent Laid-Open No. 2010-159860 (Patent Document 1). The bushing of Patent Document 1 has a structure in which a shaft member and an outer cylinder are connected by a rubber-like elastic body.

If both high spring properties in an axis-perpendicular direction and low spring properties in a torsional direction are required as in a suspension bushing, as shown in Patent Document 1, a structure may be adopted in which a first bulging part and a second bulging part are arranged concentrically by providing the first bulging part in the shaft member and providing the second bulging part in the outer cylinder.

In the suspension bushing or the like, there are also cases where low spring properties are required for an input in the torsional direction. In this case, by making the shaft member non-adhesive to the rubber-like elastic body, relative rotation between the shaft member and the rubber-like elastic body is allowed, and the required low spring properties in the torsional direction can be realized.

However, as a result of a study by the present inventors, the following finding has been obtained. In the above-mentioned structure, when the shaft member is simply non-adhesive to the rubber-like elastic body and torsional displacement (rotation) is allowed, high spring properties are less likely to be set in the axis-perpendicular direction. If relatively hard spring properties are required in the axis-perpendicular direction, there is a risk that the required properties may not be able to be satisfied.

SUMMARY

According to one aspect, a sliding bushing is provided which has a structure in which an inner shaft member and an outer tube member are connected by a main rubber elastic body and sliding of the inner shaft member with respect to the main rubber elastic body is allowed. The inner shaft member includes a bulge part provided midway in an axial direction. A braided cloth-like sliding liner is arranged between the inner shaft member and the main rubber elastic body so as to be non-adhesive and slidable with respect to the inner shaft member. In a portion of the sliding liner arranged on an outer periphery with respect to a large diameter part of the bulge part of the inner shaft member, a coarse part is provided of coarser braid mesh than a portion of the sliding liner arranged on an outer periphery with respect to a small diameter part on both axial sides of the large diameter part.

DESCRIPTION OF THE EMBODIMENTS

Figure 1:
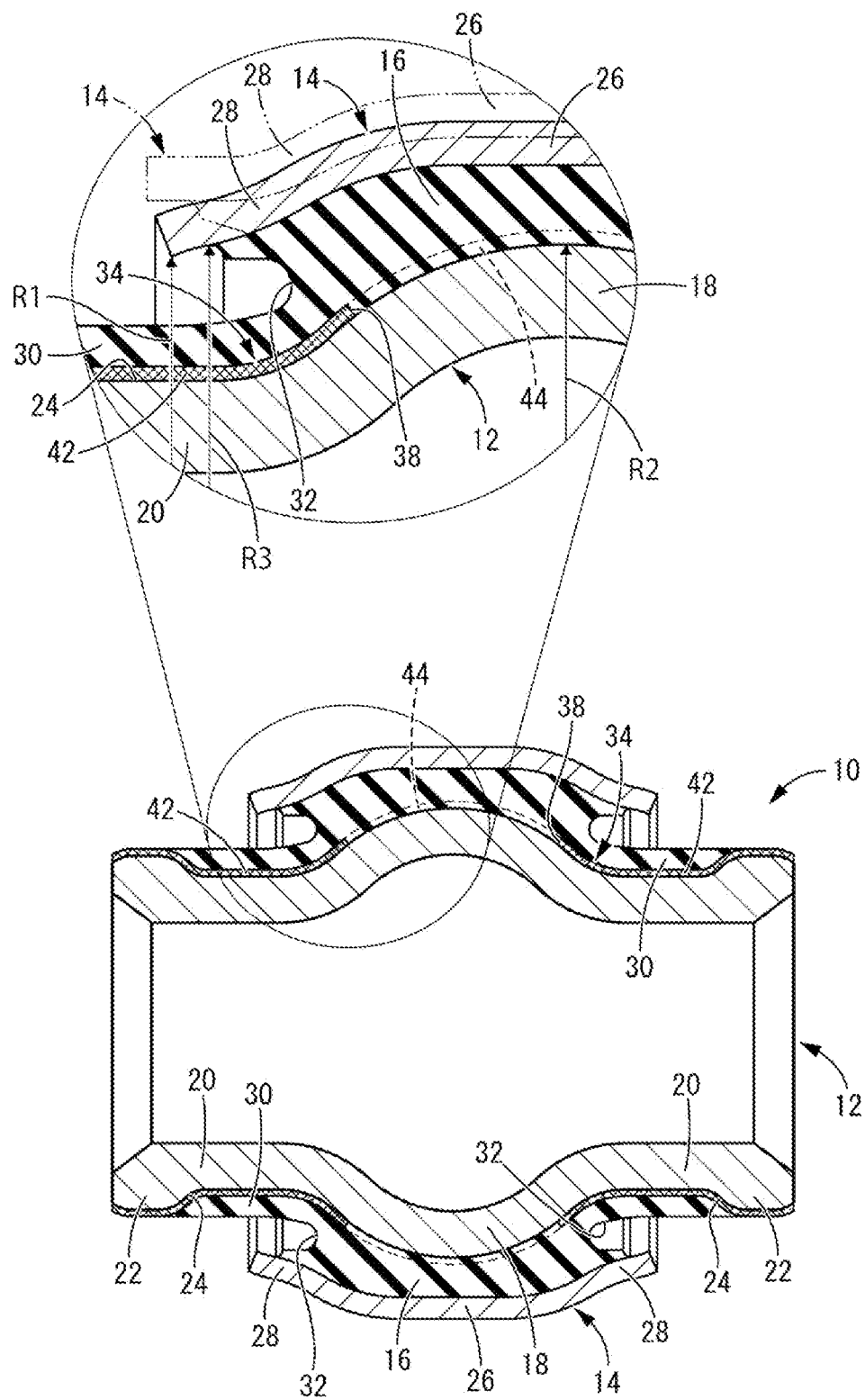
FIG. 1 is a longitudinal sectional view showing a suspension bushing as a first embodiment of the disclosure.

The disclosure provides a sliding bushing in which both hard spring properties in an axis-perpendicular direction and soft spring properties in a torsional direction and a prying direction can be advantageously set.

Described below are aspects for understanding of the disclosure. However, the aspects described below are exemplary and may be adopted in combination with each other as appropriate. Moreover, components described in each aspect may be recognized and adopted independently wherever possible, and may be adopted in combination with any component described in another aspect as appropriate. Accordingly, in the disclosure, various different aspects may be realized and the disclosure is not limited to the aspects described below.

According to one aspect, a sliding bushing is provided which has a structure in which an inner shaft member and an outer tube member are connected by a main rubber elastic body and sliding of the inner shaft member with respect to the main rubber elastic body is allowed. The inner shaft member includes a bulge part provided midway in an axial direction. A braided cloth-like sliding liner is arranged between the inner shaft member and the main rubber elastic body so as to be non-adhesive and slidable with respect to the inner shaft member. In a portion of the sliding liner arranged on an outer periphery with respect to a large diameter part of the bulge part of the inner shaft member, a coarse part is provided of coarser braid mesh than a portion of the sliding liner arranged on an outer periphery with respect to a small diameter part on both axial sides of the large diameter part.

According to the sliding bushing having the structure in accordance with this aspect, by making the inner shaft member and the main rubber elastic body non-adhesive at least in a portion where the sliding liner is arranged and by providing the bulge part in the inner shaft member, with respect to an input in the prying direction, low spring properties due to reduction of a compression spring component may be realized. By making the inner shaft member and the main rubber elastic body non-adhesive in the portion where the sliding liner is arranged, with respect to an input in the torsional direction, low spring properties due to sliding of the inner shaft member and the main rubber elastic body may be achieved. Moreover, since sliding resistance between the inner shaft member and the main rubber elastic body is reduced by the sliding liner, low spring properties in the prying direction and the torsional direction may be relatively advantageously realized.

A portion of the sliding liner attached to the large diameter part of the bulge part easily follows the shape of an outer peripheral surface of the bulge part by the coarse part of large braid mesh. Accordingly, since it becomes easy to dispose the sliding liner along an outer peripheral surface of the inner shaft member and a gap between the inner shaft member and the sliding liner can be reduced, slidability can be ensured by preventing the main rubber elastic body from entering between the sliding liner and the inner shaft member, and the sliding liner can be prevented from being deformed into an unintended shape such as a wrinkled shape.

In the sliding liner, a portion attached to the small diameter part provided on both axial sides of the large diameter part is of smaller braid mesh than the portion attached to the large diameter part of the bulge part. In the portion attached to the small diameter part that is of small braid mesh, since deformation of the main rubber elastic body is strongly restrained by the sliding liner, axially outward deformation of the main rubber elastic body is restricted. Hence, when there is an input in the axis-perpendicular direction, axially outward escape of the main rubber elastic body is suppressed, and the main rubber elastic body is efficiently compressed, thereby exhibiting high spring properties. In this way, by increasing the size of the braid mesh formed in the portion of the sliding liner attached to the large diameter part and decreasing the size of the braid mesh in the portion of the sliding liner attached to the small diameter part, high spring properties in the axis-perpendicular direction can be realized while attachability of the sliding liner to the inner shaft member having the bulge part can be improved.

According to another aspect, in the sliding bushing described in the above aspect, a notch is formed in the coarse part of the sliding liner.

According to the sliding bushing having the structure in accordance with this aspect, since the notch of the sliding liner is pushed and widened by the large diameter part of the bulge part, deformation of the coarse part that follows the bulge part is allowed and facilitated by the notch. In this aspect, it is also possible to cause such a notch to function as one aspect of the coarse part by pushing and widening the notch to make it open. Hence, by appropriately adjusting the size or shape of the notch, spring properties or the like of the main rubber elastic body may be improved in degree of freedom in tuning.

According to another aspect, in the sliding bushing described in any of the above aspects, the sliding liner is loosely braided in the coarse part.

According to the sliding bushing having the structure in accordance with this aspect, by providing a portion of the sliding liner that is loosely braided in advance by changing a knitting method or weaving method or the like, followability of the coarse part with respect to an outer shape of the bulge part can be enhanced.

According to another aspect, in the sliding bushing described in any of the above aspects, the sliding liner is composed of two split liners facing each other in the axial direction of the inner shaft member. Each end on a side of the two split liners facing each other is arranged on the outer periphery of the large diameter part of the bulge part of the inner shaft member and serves as the coarse part.

According to the sliding bushing having the structure in accordance with this aspect, since the coarse part is provided at the end of the split liner, for example, formation of the coarse part by a change in the knitting method or weaving method becomes easy.

According to another aspect, in the sliding bushing described in any of the above aspects, the sliding liner is arranged entirely between overlapping surfaces of the inner shaft member and the main rubber elastic body.

According to the sliding bushing having the structure in accordance with this aspect, frictional resistance or the like during sliding of the inner shaft member and the main rubber elastic body is relatively advantageously reduced by the sliding liner arranged entirely between the overlapping surfaces of the inner shaft member and the main rubber elastic body, and low spring properties in the prying direction and the torsional direction are relatively effectively realized.

According to another aspect, in the sliding bushing described in any of the above aspects, the overlapping surfaces of the inner shaft member and the main rubber elastic body extend axially outward from the sliding liner.

According to the sliding bushing having the structure in accordance with this aspect, by directly overlapping the inner shaft member and the main rubber elastic body without via the sliding liner axially outside the sliding liner, slidability in the axial direction of the main rubber elastic body with respect to the inner shaft member is reduced axially outside the sliding liner. Accordingly, at an axial central portion that contributes greatly to the spring properties when there is an input in the prying direction or the torsional direction, while low spring properties due to low friction of the sliding liner can be achieved, when there is an input in the axis-perpendicular direction, the main rubber elastic body is restricted from escaping axially outward by direct overlap with the inner shaft member, and high spring properties in the axis-perpendicular direction can be realized.

According to another aspect, in the sliding bushing described in any of the above aspects, the outer tube member includes a tapered part whose diameter decreases axially outward at both axial end portions. A minimum inner diameter of the tapered part of the outer tube member is smaller than a maximum outer diameter of the bulge part of the inner shaft member.

According to the sliding bushing having the structure in accordance with this aspect, axially outward deformation of the main rubber elastic body is restricted by the tapered part of the outer tube member, and relatively hard spring properties can be set in the axis-perpendicular direction. If the main rubber elastic body is compressed between the bulge part and the tapered part with respect to an input in the axial direction, hard spring properties can also be set in the axial direction.

According to the disclosure, both hard spring properties in the axis-perpendicular direction and soft spring properties in the torsional direction and the prying direction can be advantageously set.

Embodiments of the disclosure will be described below with reference to the drawings.

FIG. 1 shows a suspension bushing 10 for an automobile as a first embodiment of a sliding bushing having a structure in accordance with the disclosure. The suspension bushing 10 has a structure in which an inner shaft member 12 and an outer tube member 14 are elastically connected by a main rubber elastic body 16.

The inner shaft member 12 is, for example, a high-rigidity member made of metal, and has a cylindrical shape with a small diameter as a whole. The inner shaft member 12 may have a solid rod shape or the like. In that case, a fixing structure for fixation to a suspension arm or the like may be provided, for example, at both axial ends.

A bulge part 18 is provided in an axial central portion of the inner shaft member 12. The bulge part 18 is a large diameter portion protruding toward an outer periphery. The bulge part 18 has an outer peripheral surface having a substantially spherical annular shape convex toward the outer periphery. In the bulge part 18 of the present embodiment, an inner peripheral surface is a curved surface corresponding to the outer peripheral surface, and a thickness dimension is substantially constant over the entire axial direction. However, in the bulge part, the thickness dimension may also vary in the axial direction, and the inner peripheral surface may be, for example, a cylindrical surface extending straight in the axial direction.

The inner shaft member 12 has small diameter cylinders 20 and 20 provided axially outside the bulge part 18. The small diameter cylinder 20 has a smaller outer diameter than the bulge part 18, and extends axially outward from an axial end of the bulge part 18. At an axial end of each small diameter cylinder 20 opposite to the bulge part 18, a protrusion 22 protruding toward the outer periphery is provided over the entire periphery. In the small diameter cylinder 20 of the inner shaft member 12, a recess 24 opening on an outer peripheral surface is provided over the entire periphery between the protrusion 22 and the bulge part 18 in the axial direction.

The outer tube member 14 is a high-rigidity member like the inner shaft member 12. Compared to the inner shaft member 12, the outer tube member 14 has a substantially cylindrical shape with a small thickness and a large diameter, and has a shorter axial length dimension. In the outer tube member 14, an axial central portion is taken as a cylindrical part 26 extending linearly in the axial direction, and tapered parts 28 and 28 inclined axially outward toward an inner periphery are provided on both axial sides of the cylindrical part 26. The tapered part 28 may be inclined at a constant angle with respect to the axial direction, or may have an inclination angle varying in the axial direction. In the present embodiment, the inclination angle of the tapered part 28 with respect to the axial direction becomes smaller axially outward. The tapered part 28 may be provided in advance at the time of formation of the outer tube member 14, or may be formed, for example, in association with later-described diameter reduction processing of the outer tube member 14.

By providing the tapered parts 28 and 28 on both axial sides of the cylindrical part 26, the outer tube member 14 has a sectional shape concave toward the inner periphery as a whole in the longitudinal section shown in FIG. 1. In the outer tube member 14, an axial dimension of the cylindrical part 26 is smaller than an axial length dimension of the bulge part 18, and an axial length dimension of the entire outer tube member 14 is greater than the axial length dimension of the bulge part 18. The cylindrical part 26 is not essential in the outer tube member 14. For example, an outer tube member having a curved shape overall in the longitudinal section may also be adopted.

The inner shaft member 12 is inserted through the inner periphery of the outer tube member 14, and the inner shaft member 12 and the outer tube member 14 are arranged concentrically. The inner shaft member 12 protrudes toward both axial sides with respect to the outer tube member 14. Both axial ends of the outer tube member 14 are located on both axially outer sides of the bulge part 18 of the inner shaft member 12. The bulge part 18 located inside the outer tube member 14 in the axial direction and a radial direction is arranged so as to be wrapped by the outer tube member 14 with a predetermined distance therebetween. The distance in the radial direction between the inner shaft member 12 and the outer tube member 14 is minimum in an axial center where the bulge part 18 and the cylindrical part 26 face each other, and gradually increases axially outward in the bulge part 18. A minimum inner diameter R1 of the tapered part 28 is smaller than a maximum outer diameter R2 of the bulge part 18. More preferably, a minimum inner diameter R3 of the tapered part 28 at an axially outer end of a portion where the main rubber elastic body 16 is fixed is smaller than the maximum outer diameter R2 of the bulge part 18, and the main rubber elastic body 16 is continuously provided in the axial direction between axially facing surfaces of the bulge part 18 and the tapered part 28.

The inner shaft member 12 and the outer tube member 14 are elastically connected by the main rubber elastic body 16. The main rubber elastic body 16 has a cylindrical shape as a whole, and is provided to connect facing surfaces of an outer peripheral surface of the inner shaft member 12 and an inner peripheral surface of the outer tube member 14. An inner fixing part 30 filled in the recess 24 of the inner shaft member 12 is provided at an inner peripheral end of the main rubber elastic body 16. In the present embodiment, the main rubber elastic body 16 is non-adhesive to the inner shaft member 12 and is formed as an integrally vulcanized molded product including the outer tube member 14. The inner shaft member 12 and the main rubber elastic body 16 that are non-adhesive to each other are allowed to slide in a prying direction and a torsional direction.

The main rubber elastic body 16 is arranged in an axial region straddling the outer peripheral surface of the bulge part 18 and the outer peripheral surface of the small diameter cylinders 20 and 20 in the inner shaft member 12. In the main rubber elastic body 16, an axial length dimension of a portion arranged so as to directly fill a space between radially facing surfaces of the inner shaft member 12 and the outer tube member 14 is desirably an axial length extending from the bulge part 18 to the small diameter cylinders 20 and 20 extending on both axial sides. In the portion of the main rubber elastic body 16 arranged so as to directly fill the space between the radially facing surfaces of the inner shaft member 12 and the outer tube member 14, a radial thickness dimension is greater at both axial end portions than in the axial center. However, the main rubber elastic body 16 may also extend in the axial direction with a substantially constant radial thickness dimension.

On an axial end face of the main rubber elastic body 16, hollow parts 32 and 32 having a concave shape opening in the axial direction are formed over the entire periphery between the inner shaft member 12 and the outer tube member 14 in the radial direction, and a bottom of the hollow parts 32 and 32 reaches the outer periphery of the bulge part 18. Depth, size, shape or the like of the hollow part 32 is not particularly limited. For example, the hollow part 32 may have a depth not reaching the outer periphery of the bulge part 18 from the axial end face of the main rubber elastic body 16. The hollow part 32 may not be necessarily provided.

By performing diameter reduction processing such as drawing on the outer tube member 14 after vulcanization molding of the main rubber elastic body 16, tensile stress due to thermal contraction acting on the main rubber elastic body 16 is reduced, and durability of the main rubber elastic body 16 may be improved. At the time of diameter reduction processing of the outer tube member 14, by further reducing the diameter of an axial end of the outer tube member 14, the tapered parts 28 and 28 are formed in the outer tube member 14. Accordingly, while the inner shaft member 12 can be inserted through the outer tube member 14 before molding of the main rubber elastic body 16, the minimum inner diameter R1 of the tapered parts 28 and 28 can be made smaller than the maximum outer diameter R2 of the bulge part 18 after molding of the main rubber elastic body 16. Coming off of the inner shaft member 12 with respect to the outer tube member 14 is prevented by indirect engagement between the bulge part 18 and the tapered parts 28 and 28 via the main rubber elastic body 16. By making the minimum inner diameter R3 of the portion in the tapered parts 28 and 28 where the main rubber elastic body 16 is fixed smaller than the maximum outer diameter R2 of the bulge part 18, it is possible to achieve hard spring properties due to compression of the main rubber elastic body 16 between the bulge part 18 and the tapered parts 28 and 28 when there is a vibration input in the axial direction.

The outer tube member 14 is adhered to the main rubber elastic body 16 by vulcanization. No sliding layer composed of a liner or a coating or the like is provided between the overlapping surfaces of the outer tube member 14 and the main rubber elastic body 16. Hence, when the outer tube member 14 is subjected to diameter reduction, problems such as wrinkles in the sliding layer are unlikely to occur. The main rubber elastic body 16 is fixed over an inner peripheral surface of the cylindrical part 26 and an inner peripheral surface of the tapered parts 28 and 28 in the outer tube member 14.

Figure 2A:
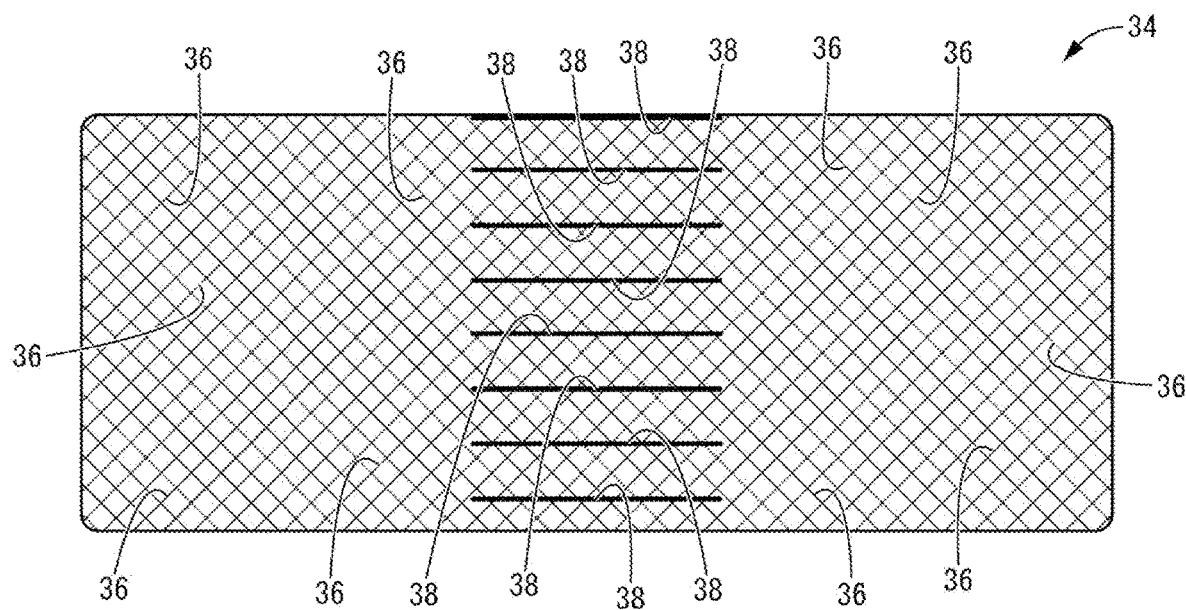
FIG. 2A is a side view of a sliding liner constituting the suspension bushing shown in FIG. 1.

A sliding liner 34 is arranged between the overlapping surfaces of the inner shaft member 12 and the main rubber elastic body 16. The sliding liner 34 is a cloth-like braided body (knitted fabric or woven fabric) formed by knitting or weaving low-friction yarn, in which a stitch or weave 36 being a gap (braid mesh) between fibers constituting the braided body is formed penetrating substantially throughout the sliding liner 34. As shown in FIG. 2A, the sliding liner 34 has a substantially cylindrical shape as a whole. However, the sliding liner 34 may also be formed in a rectangular sheet shape and wound around the inner shaft member 12 to have a substantially tubular shape.

The sliding liner 34 is, for example, a polytetrafluoroethylene (PTFE) liner formed by braiding low-friction yarn spun including a fluororesin fiber, and has a small surface friction coefficient. The yarn constituting the sliding liner 34 may be blended yarn or commingled yarn in which the fluororesin fiber and a fiber made of another material (for example, synthetic fiber other than fluororesin fiber or glass fiber) are appropriately blended or commingled. The sliding liner 34 may be a braided body impregnated with a synthetic resin. The yarn constituting the sliding liner 34 may not necessarily stretch and shrink, and may be appropriately selected from, for example, fiber materials to be blended or commingled and be imparted with stretchability.

A notch 38 is formed in an axial central portion of the sliding liner 34. The number, arrangement, shape or the like of the notch 38 is not particularly limited. In the present embodiment, a plurality of notches 38 extending linearly in the axial direction are formed separated from each other in a circumferential direction. For example, the notch 38 may extend in the axial direction while being inclined in the circumferential direction, or may extend in the circumferential direction, or may extend in a bent or curved manner. The notch 38 may also be formed in a slit shape opening with a certain width in advance.

Figure 2B:
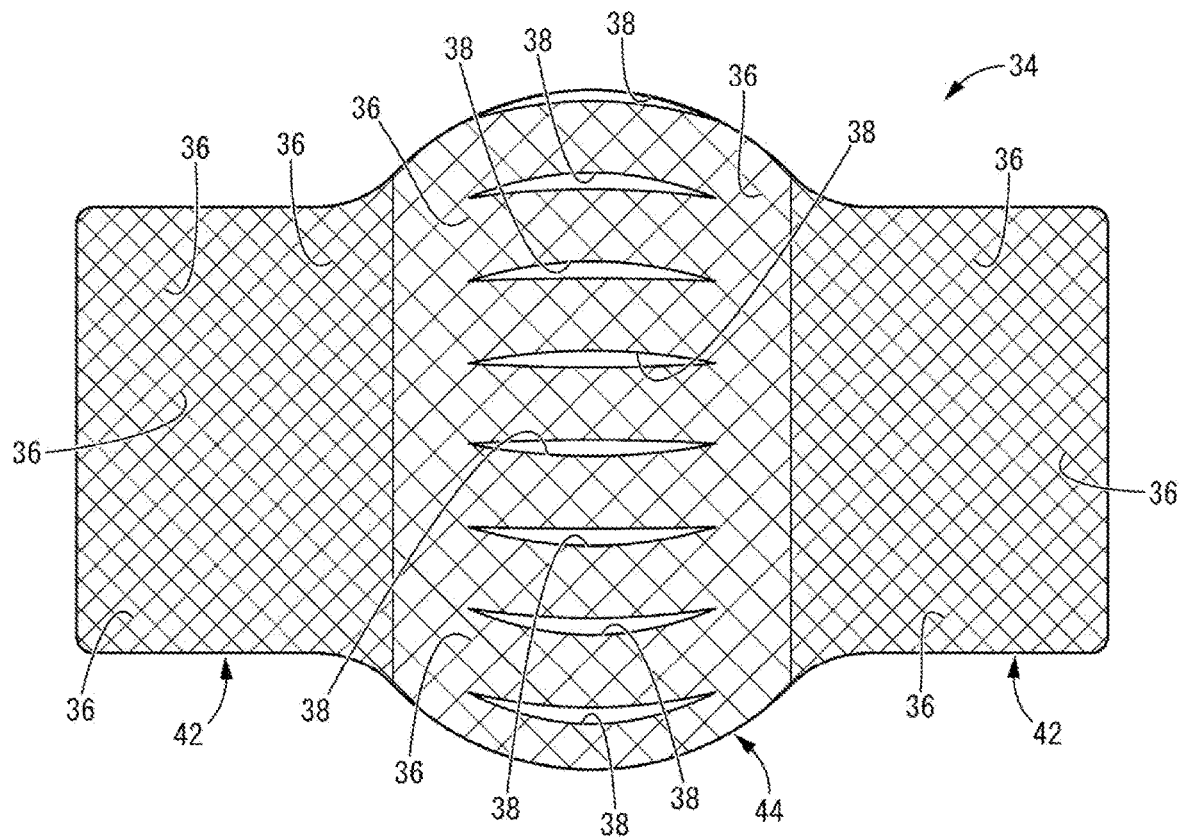
FIG. 2B is a side view showing the sliding liner shown in FIG. 2A in a state of being attached to an inner shaft member.

As shown in FIG. 2B, the sliding liner 34 is attached to the inner shaft member 12 in an externally inserted state. The sliding liner 34 is externally inserted onto the inner shaft member 12 in a non-adhesive manner, and is allowed to slide with respect to the inner shaft member 12 in the prying direction and the torsional direction. By deforming the braided cloth-like sliding liner 34 along the outer peripheral surface of the inner shaft member 12, the stitch or weave 36 is pushed and widened by the inner shaft member 12. In the sliding liner 34, both axial end portions externally inserted onto the small diameter cylinders 20 and 20 are taken as a fine part 42 in which the stitch or weave 36 is fine, and the axial central portion externally inserted onto the bulge part 18 is taken as a coarse part 44 in which the stitch or weave 36 is coarse. In the present embodiment, in the inner shaft member 12, a large diameter part is composed of the entire bulge part 18 in the axial direction, and a small diameter part is composed of a portion axially outside from the bulge part 18.

In the sliding liner 34, greater deformation is allowed in the coarse part 44 having a large stitch or weave 36 than in the fine part 42. Hence, when the sliding liner 34 is attached to the inner shaft member 12, the coarse part 44 is deformed along a surface of the bulge part 18, the sliding liner 34 is arranged along a surface of the inner shaft member 12, and wrinkles or slacks are less likely to occur. In the present embodiment, as shown in FIG. 2A, the notch 38 is provided in the coarse part 44. When the sliding liner 34 is attached to the inner shaft member 12, as shown in FIG. 2B, by widening the opening of the notch 38 in the circumferential direction, deformation along the bulge part 18 is allowed and facilitated in the axial central portion of the sliding liner 34.

In the present embodiment, since the notch 38 is provided in the coarse part 44 constituting the axial central portion of the sliding liner 34 and the notch 38 is pushed and widened by the bulge part 18, relatively great diameter expansion and deformation are allowed in the coarse part 44 constituting the axial central portion of the sliding liner 34.

In the sliding liner 34, the stitch or weave 36 is also pushed and widened in a portion inserted through the small diameter cylinders 20 and 20, and the sliding liner 34 is in close contact with the outer peripheral surface of the small diameter cylinders 20 and 20 without a gap. However, when the sliding liner 34 is attached to the inner shaft member 12, since the amount of diameter expansion and deformation of the axial central portion including the portion externally inserted onto the bulge part 18 is greater than the amount of diameter expansion and deformation of both axial end portions being the portion externally inserted onto the small diameter cylinders 20 and 20, there is unevenness in coarseness and fineness of braiding between the fine part 42 and the coarse part 44.

For example, the sliding liner 34 attached to the inner shaft member 12 is set in a cavity of a molding die (not shown) together with the inner shaft member 12 at the time of vulcanization molding of the main rubber elastic body 16.

By molding the main rubber elastic body 16 on an outer peripheral side of the sliding liner 34, the sliding liner 34 is arranged between the inner shaft member 12 and the main rubber elastic body 16.

The sliding liner 34 of the present embodiment has a length covering the outer peripheral surface of the inner shaft member 12 over the entire axial length. Accordingly, the sliding liner 34 is provided over the entire overlapping surfaces of the inner shaft member 12 and the main rubber elastic body 16. Particularly, in the present embodiment, the sliding liner 34 extends to the axially outside from the overlapping surfaces of the inner shaft member 12 and the main rubber elastic body 16, and an outer peripheral surface of the protrusions 22 and 22 is covered by the sliding liner 34. However, an axial length dimension of the sliding liner 34 may not necessarily be the same as the axial length dimension of the inner shaft member 12, and may be the same as, for example, an axial length dimension of the overlapping surfaces of the inner shaft member 12 and the main rubber elastic body 16.

The main rubber elastic body 16 is subjected to vulcanization molding in a state of entering the stitch or weave 36 of the sliding liner 34 and/or in a state of being in close contact with, so as to enter, an uneven surface formed of braided strands. It is difficult for the sliding liner 34 to adhere to the main rubber elastic body 16 since the sliding liner 34 is formed containing a low-friction material. However, by an anchoring effect with the main rubber elastic body 16 mechanically coupled to the sliding liner 34 by entering the stitch or weave 36, or the like, the sliding liner 34 is substantially fixed to an inner peripheral surface of the main rubber elastic body 16. In the present embodiment, the anchoring effect may also be exerted by entry of the main rubber elastic body 16 into the notch 38 formed in the coarse part 44. Adhesion processing or the like may be performed on an outer peripheral surface of the sliding liner 34.

In the sliding liner 34, expansion/contraction and deformation are restricted in the fine part 42 having a small stitch or weave 36. Hence, at both axial end portions of the main rubber elastic body 16 fixed to the fine part 42, a strong deformation restraining force by the sliding liner 34 acts, and axially outward elastic deformation is restricted by the sliding liner 34.

Meanwhile, in the sliding liner 34, greater deformation is allowed in the coarse part 44 having a large stitch or weave 36 than in the fine part 42. Hence, elastic deformation is more likely to be allowed in the axial central portion of the main rubber elastic body 16 fixed to the coarse part 44 than at both axial end portions fixed to the fine part 42.

Further, the notch 38 extending in the axial direction is formed in the sliding liner 34 whose initial shape has a substantially constant radial dimension. By attaching the sliding liner 34 to the inner shaft member 12 so that the axial central portion of the sliding liner 34 is expanded in diameter and deformed by the bulge part 18 being the large diameter part, an expansion dimension (opening width in the circumferential direction) of the notch 38 is increased in the large diameter part in the axial center in the bulge part 18 and is reduced in the small diameter cylinders 20 and 20 being the small diameter part on both axial sides. Hence, by the notch 38 like this, restraint imposed on the main rubber elastic body 16 by the sliding liner 34 may also be greatly exhibited in the small diameter cylinders 20 and 20 on both sides of the bulge part 18.

The suspension bushing 10 having such a structure connects a vehicle body and a suspension arm in a vibration-proof manner by attachment of the inner shaft member 12 to the vehicle body side of a subframe (not shown) or the like and attachment of the outer tube member 14 to the suspension arm side (not shown).

When a vibration in the axis-perpendicular direction (radial direction) is input between the inner shaft member 12 and the outer tube member 14, since the main rubber elastic body 16 is compressed in the axis-perpendicular direction between the inner shaft member 12 and the outer tube member 14, hard spring properties due to a compression spring component are exhibited. Particularly, since the bulge part 18 is provided in the inner shaft member 12, and the radial thickness dimension of the main rubber elastic body 16 is reduced on an outer peripheral side of the bulge part 18, hard spring properties can be achieved by compression of the main rubber elastic body 16.

Since the main rubber elastic body 16 is non-adhesive to the inner shaft member 12, when compressed in the axis-perpendicular direction, the main rubber elastic body 16 tends to be deformed axially outward according to the shape of the outer peripheral surface of the bulge part 18. Deformation of an axial end of the main rubber elastic body 16 is restricted by the fine part 42 of the sliding liner 34. Accordingly, the main rubber elastic body 16 becomes less likely to be deformed axially outward. By preventing the main rubber elastic body 16 from escaping axially outward, hard spring properties due to the compression in the axis-perpendicular direction are effectively exhibited.

Further, since both axial ends of the outer tube member 14 serve as the tapered parts 28 and 28, axially outward escape of an outer peripheral portion of the main rubber elastic body 16 is suppressed by the tapered parts 28 and 28. Accordingly, hard spring properties in the axis-perpendicular direction can be relatively effectively set.

When a vibration in the prying direction is input between the inner shaft member 12 and the outer tube member 14, since the main rubber elastic body 16 undergoes shear deformation between the bulge part 18 of the inner shaft member 12 and the outer tube member 14 and the compression spring component is reduced, low spring properties are realized in the prying direction. Since the inner shaft member 12 and the main rubber elastic body 16 are non-adhesive and slidable, a shear spring component is also reduced and a spring constant in the prying direction is further reduced. By providing the hollow part 32 in an axially outer portion of the main rubber elastic body 16, the compression spring component of the main rubber elastic body 16 is further reduced during prying displacement of the inner shaft member 12 and the outer tube member 14.

When a vibration in the torsional direction is input between the inner shaft member 12 and the outer tube member 14, since the main rubber elastic body 16 undergoes shear deformation between the bulge part 18 of the inner shaft member 12 and the outer tube member 14 and the compression spring component is reduced, low spring properties are realized in the torsional direction. Since the inner shaft member 12 and the main rubber elastic body 16 are non-adhesive and slidable, a shear spring component is also reduced and a spring constant in the torsional direction is further reduced.

The sliding liner 34 is arranged between the overlapping surfaces of the inner shaft member 12 and the main rubber elastic body 16, and frictional resistance during sliding between the outer peripheral surface of the inner shaft member 12 and the inner peripheral surface of the main rubber elastic body 16 is reduced. Accordingly, low spring properties in the prying direction and the torsional direction can be relatively effectively realized. In the present embodiment, since the sliding liner 34 is provided over the entire axial length of the inner shaft member 12, slidability between the inner shaft member 12 and the main rubber elastic body 16 may be effectively improved by the sliding liner 34, and low spring properties in the prying direction and the torsional direction are relatively advantageously realized.

By forming a sliding layer between the overlapping surfaces of the inner shaft member 12 and the main rubber elastic body 16 by the sliding liner 34, the sliding layer can be provided more easily than, for example, in the case of providing the sliding layer by applying a low-friction sliding coating to the outer peripheral surface of the inner shaft member 12.

Figure 3A:
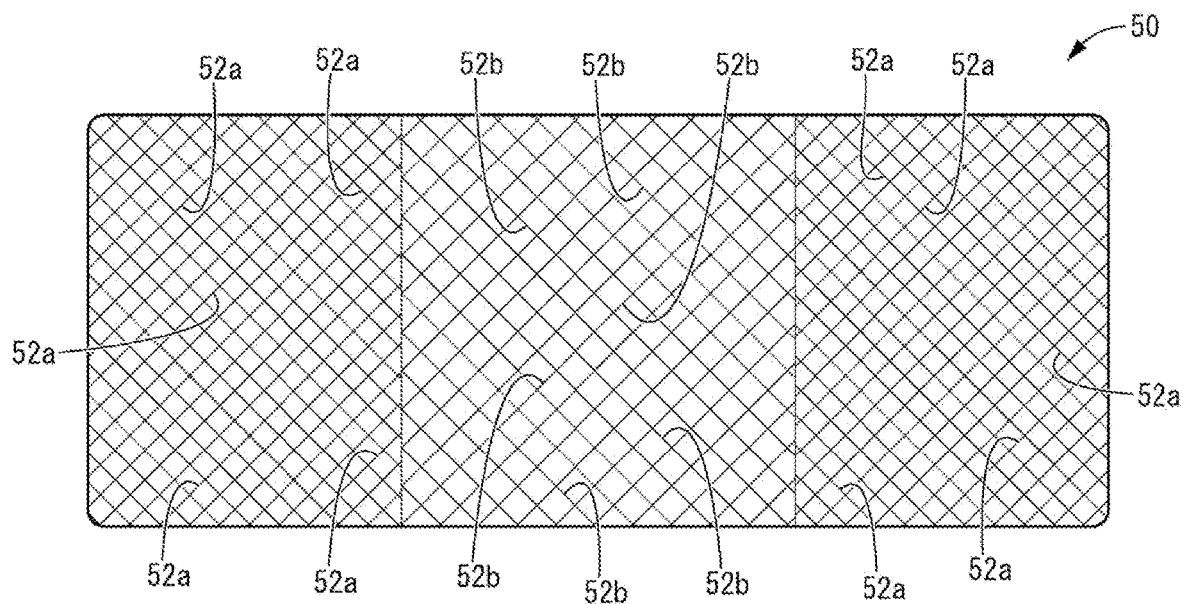
FIG. 3A is a side view of a sliding liner constituting a sliding bushing as a second embodiment of the disclosure.

In FIG. 3A, a sliding liner 50 constituting a sliding bushing as a second embodiment of the disclosure is shown. Like the sliding liner 34 of the first embodiment, the sliding liner 50 has a braided cloth shape and has a substantially cylindrical shape as a whole. In the following description, the members and portions substantially the same as those of the previous embodiment are designated by the same reference numerals in the drawings, and the description thereof will be omitted.

In the sliding liner 50, a stitch or weave 52a at both axial end portions and a stitch or weave 52b in the axial central portion are different in size. The both axial end portions having a fine braid mesh 52a are taken as the fine part 42, and the axial central portion having a coarse braid mesh 52b is taken as the coarse part 44. The coarse part 44, for example, can be formed by partially loosely braiding by partially changing a knitting method or weaving method or the like in the sliding liner 50. In the present embodiment, in the coarse part 44 that is loosely braided as compared to the fine part 42, the braid mesh 52b is larger than the braid mesh 52a of the fine part 42 in a stand-alone state before attachment to an inner shaft member.

Figure 3B:
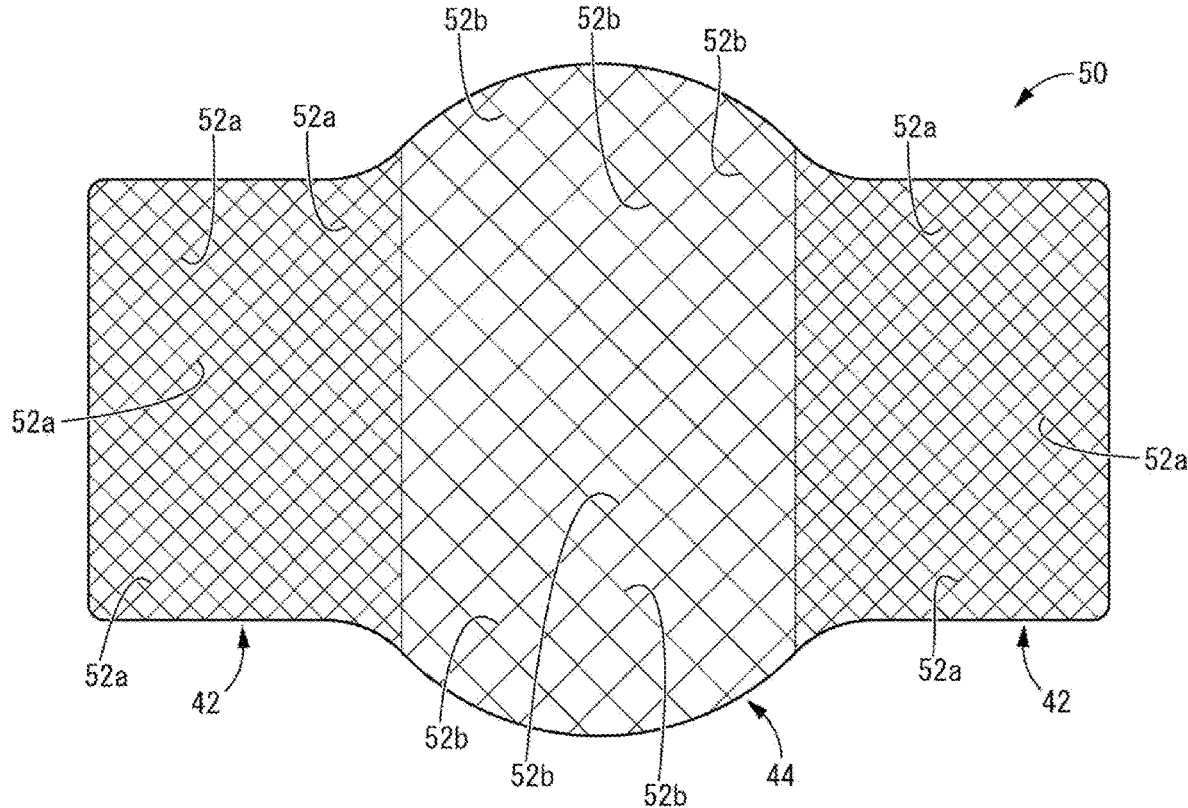
FIG. 3B is a side view showing the sliding liner shown in FIG. 3A in a state of being attached to an inner shaft member.

In the sliding liner 50 in the stand-alone state shown in FIG. 3A before attachment to the inner shaft member, the braid mesh 52b in the loosely braided coarse part 44 is larger than the braid mesh 52a in the fine part 42. Accordingly, stretching of the sliding liner 50 due to deformation of the coarse part 44 is allowed in the loosely braided axial central portion, and, in a state shown in FIG. 3B in which the sliding liner 50 is attached to the inner shaft member, the axial central portion has a larger diameter than both axial end portions. As a result, the sliding liner 50 is able to be deformed following the shape of an outer peripheral surface of the inner shaft member including a bulge part. A gap is less likely to be formed between the outer peripheral surface of the inner shaft member and the sliding liner 50. For example, unintended deformation such as wrinkles or folds is unlikely to occur in the sliding liner 50 during molding of the main rubber elastic body. The sliding liner 50 may be formed in a shape corresponding to the outer peripheral surface of the inner shaft member, in which the coarse part 44 is set to have a larger diameter than the fine part 42 in advance. In this case, it is not essential to push and widen the coarse part 44 by the bulge part of the inner shaft member.

In the sliding bushing using the sliding liner 50 of the present embodiment as above, like the suspension bushing 10 of the first embodiment, a low spring constant in the prying direction and the torsional direction and a high spring constant in the axis-perpendicular direction can both be realized.

Figure 4A:
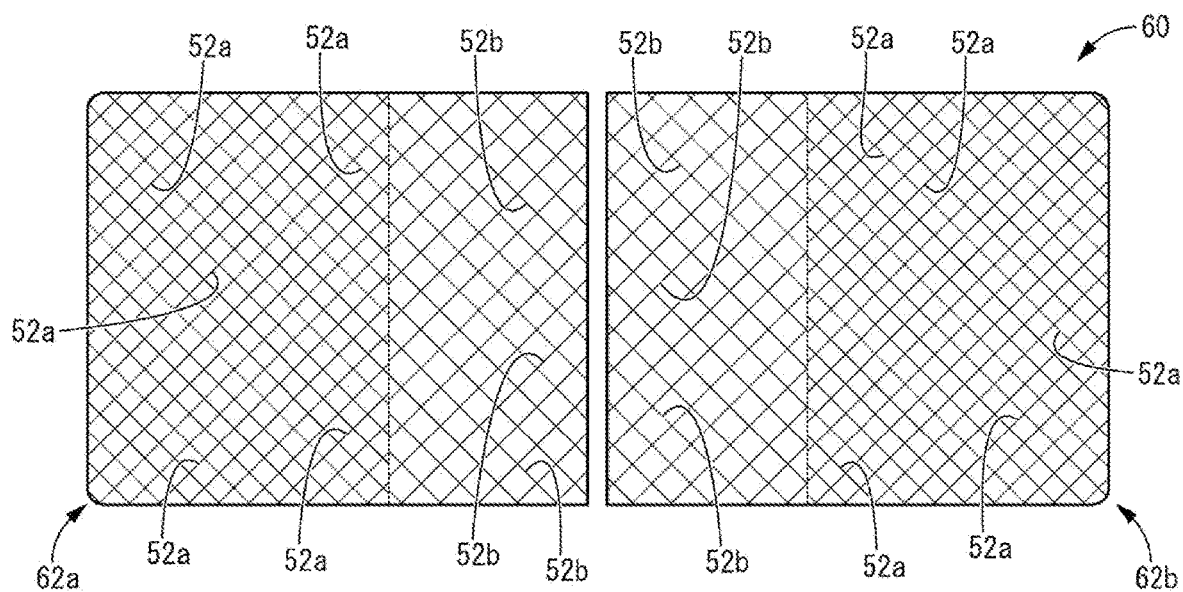
FIG. 4A is a side view of a sliding liner constituting a sliding bushing as a third embodiment of the disclosure.

In FIG. 4A, a sliding liner 60 constituting a sliding bushing as a third embodiment of the disclosure is shown. The sliding liner 60 is composed of split liners 62a and 62b independent of each other. The split liners 62a and 62b are arranged to face each other in the axial direction of the inner shaft member 12 and are attached to both axial sides with respect to the inner shaft member 12. While the split liners 62a and 62b are arranged facing each other in a slightly separated manner in the axial direction in the present embodiment, they may also face each other while in contact with each other in the axial direction. Since the split liner 62a and the split liner 62b of the present embodiment are common parts arranged so as to face each other in the axial direction, their structure is described as the split liner 62.

An axially outer portion of the split liner 62 attached to the small diameter cylinder 20 of the inner shaft member 12 is taken as the fine part 42 in which the fine stitch or weave 52a is set. An axially inner portion of the split liner 62 attached to the bulge part 18 of the inner shaft member 12 is taken as the coarse part 44 in which the coarse stitch or weave 52b is set.

Figure 4B:
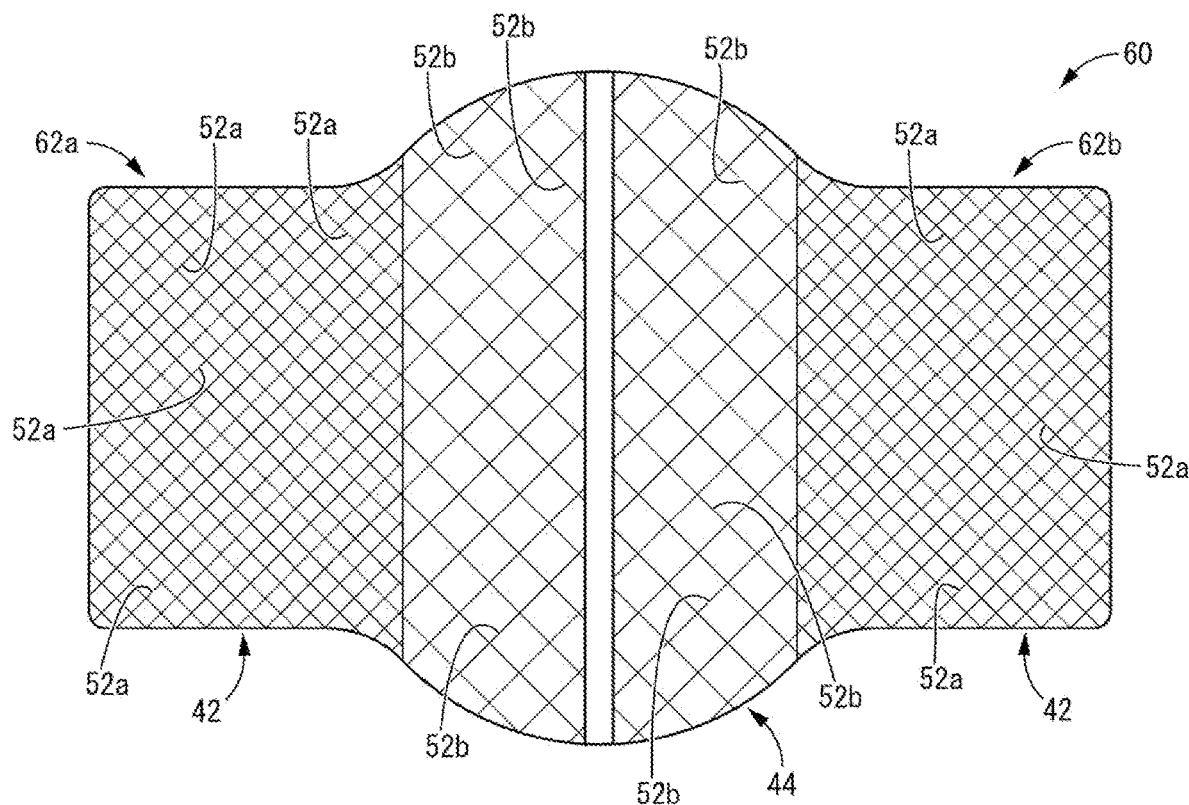
FIG. 4B is a side view showing the sliding liner shown in FIG. 4A in a state of being attached to an inner shaft member.

In the split liner 62 in the stand-alone state before attachment to the inner shaft member 12, the braid mesh 52b in the coarse part 44 is larger than the braid mesh 52a in the fine part 42. Accordingly, stretching of the split liner 62 due to deformation of the coarse part 44 is allowed in the axially inner portion, and, in a state shown in FIG. 4B in which the split liner 62 is attached to the inner shaft member, the split liner 62 follows and adheres to the outer peripheral surface of the inner shaft member including the bulge part. By attaching a pair of split liners 62a and 62b to both axial sides of the inner shaft member, the sliding liner 60 corresponding to the shape of the outer peripheral surface of the inner shaft member can be obtained. In the split liners 62a and 62b, an inner portion serving as the facing side in the axial direction is taken as the coarse part 44 having a coarse braid mesh.

In the sliding bushing using the sliding liner 60 of the present embodiment as above, like the suspension bushing 10 of the first embodiment, a low spring constant in the prying direction and the torsional direction and a high spring constant in the axis-perpendicular direction can both be realized. Since the sliding liner 60 is composed of a combination of the split liners 62a and 62b in which the coarse part 44 and the fine part 42 are respectively formed at ends, fabrication of a braid in which coarseness is changed is easy compared to the sliding liner 50 of the second embodiment in which formation of the coarse part 44 between the fine parts 42 and 42 is necessary.

Figure 5:
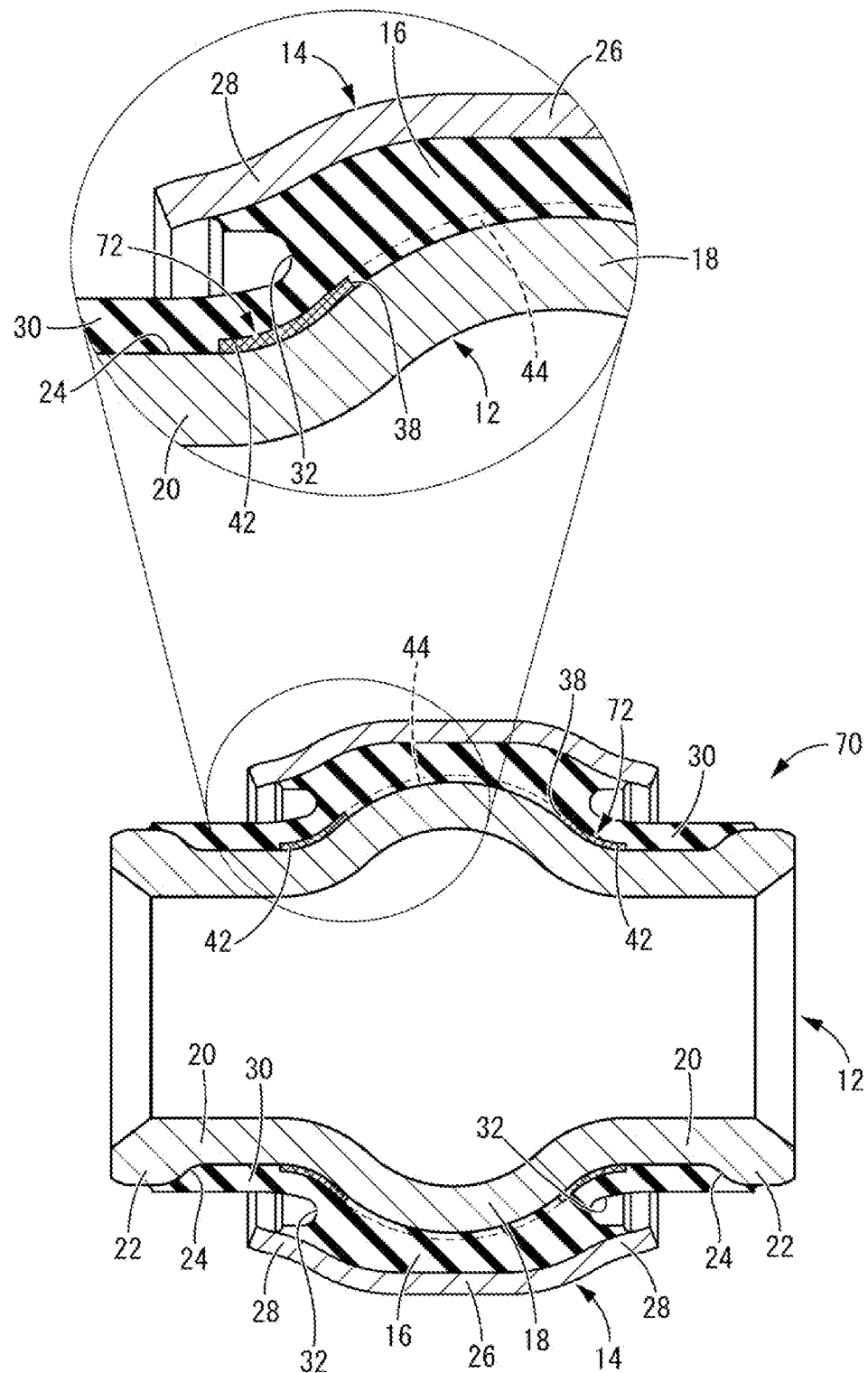
FIG. 5 is a longitudinal sectional view showing a suspension bushing as a fourth embodiment of the disclosure.

FIG. 5 shows a suspension bushing 70 as a sliding bushing having a structure in accordance with a fourth embodiment. The suspension bushing 70 includes a sliding liner 72 that is smaller in axial length dimension than the inner shaft member 12. The sliding liner 72 is partially provided only in an axial intermediate portion of the inner shaft member 12. The axial length dimension of the sliding liner 72 is smaller than the axial length dimension of the overlapping surfaces of the inner shaft member 12 and the main rubber elastic body 16. The sliding liner 72 is provided only in the axial central portion of the overlapping surfaces of the inner shaft member 12 and the main rubber elastic body 16. Specifically, the sliding liner 72 is arranged so as to cover, for example, the entire outer peripheral surface of the bulge part 18 and a side wall inner surface on an axially inner side of the recess 24 in the inner shaft member 12, and a bottom wall inner surface of the recess 24 and a surface of the protrusion 22 are not covered by the sliding liner 72.

By partially providing the sliding liner 72 only in the axial intermediate portion, both axial ends of the main rubber elastic body 16 excluding the sliding liner 72 directly overlap the inner shaft member 12. In other words, the overlapping surfaces of the inner shaft member 12 and the main rubber elastic body 16 extend axially outward from the sliding liner the sliding liner 72. Specifically, the bottom wall inner surface of the recess 24 in the inner shaft member 12 directly overlaps the main rubber elastic body 16 in a direct contact state without via the sliding liner 72. In the present embodiment, on both axially outer sides excluding the sliding liner 72, the inner shaft member 12 and the main rubber elastic body 16 are non-adhesive and sliding of the inner shaft member 12 and the main rubber elastic body 16 is allowed. The inner shaft member 12 and the main rubber elastic body 16 may also adhere to each other on both axially outer sides excluding the sliding liner 72.

In this way, by directly overlapping the inner shaft member 12 and the main rubber elastic body 16 axially outside the sliding liner 72, large sliding resistance is set between the overlapping surfaces of the inner shaft member 12 and the main rubber elastic body 16. In the present embodiment, since the inner shaft member 12 and the main rubber elastic body 16 are non-adhesive and are allowed to slide at both axial end portions, a friction coefficient between the inner shaft member 12 and the main rubber elastic body 16 at both axial end portions is larger than that in the axial central portion in which the sliding liner 72 is arranged.

According to the suspension bushing 70 having the structure in accordance with the present embodiment as above, when there is an input in the axis-perpendicular direction, axially outward escape of the main rubber elastic body 16 is further suppressed, and a high spring constant can be set in the axis-perpendicular direction.

Figure 6:
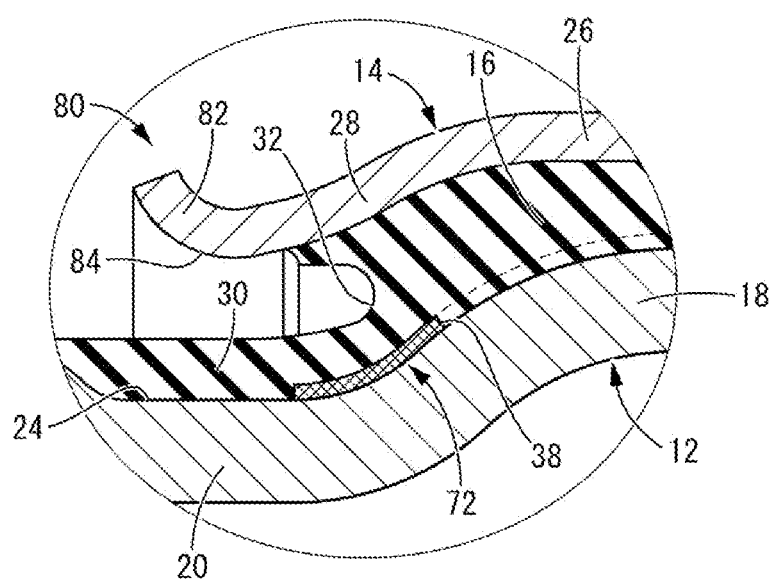
FIG. 6 is a longitudinal sectional view showing a suspension bushing as another embodiment of the disclosure.

As in a suspension bushing 80 as a sliding bushing shown in FIG. 6, a relief part 82 that curves outward can be provided axially outside the tapered part 28 in the outer tube member 14. According to this, an end face of the outer tube member 14 faces the outer peripheral side, and an inner peripheral surface 84 of an axial end of the outer tube member 14 is set as a smooth curved surface without edges. Hence, an edge of the axial end of the outer tube member 14 can be prevented from coming into contact with the main rubber elastic body 16 when there is a vibration input, and damage to the main rubber elastic body 16 is avoided. By providing the relief part 82 having a curved section at the axial end of the outer tube member 14, deformation rigidity of the outer tube member 14 may be improved.

Although the embodiments of the disclosure have been described in detail above, the disclosure is not limited by the specific description thereof. For example, it suffices if the bulge part 18 of the inner shaft member 12 is provided midway in the axial direction of the inner shaft member 12, and the bulge part 18 of the inner shaft member 12 may deviate toward either side in the axial direction with respect to an axial center of the inner shaft member 12. It is desirable that the bulge part 18 have an outer peripheral surface shape that is an arc shape in the longitudinal section corresponding to FIG. 1. However, an outer peripheral surface shape that is, for example, a polygonal shape such as a substantially trapezoidal shape, may also be adopted.

The recess 24 of the inner shaft member 12 is not essential. For example, the recess 24 may be opened axially outward.

In the tapered parts 28 and 28 of the outer tube member 14, the inner peripheral surface and the outer peripheral surface may have different inclination angles from each other. For example, in the tapered part, it may be that only the inner peripheral surface is inclined axially outward toward the inner periphery, or is thickened axially outward. The maximum outer diameter R2 of the bulge part 18 of the inner shaft member 12 may be smaller than the minimum inner diameter R1 of the tapered parts 28 and 28 of the outer tube member 14.

For purposes of avoiding interference of the outer tube member 14 at the time of prying input or the like, in the inner shaft member 12 and/or the inner fixing part 30 of the main rubber elastic body 16, a recess may be provided opening in a portion facing an end of the outer tube member 14 and extending in the circumferential direction.

It is possible that the material for forming the main rubber elastic body 16 includes a self-lubricating rubber material in which a surface friction coefficient is reduced by mixing with oil or the like. Accordingly, the slidability between the inner shaft member 12 and the main rubber elastic body 16 can further be improved.

The sliding liner may have a structure split into a plurality of parts in the circumferential direction. In the third embodiment, the sliding liner 60 split into two in the axial direction has been illustrated as an example. However, a sliding liner split into three or more in the axial direction, for example, can also be adopted. In this case, for example, in the sliding liner, it is also possible to split the coarse part 44 attached to the bulge part 18 of the inner shaft member 12 and the fine parts 42 and 42 attached to the small diameter cylinders 20 and 20 so that they are respectively independent of each other. A knitting method or weaving method of the sliding liner is not limited. For example, the sliding liner may be braided to have a tubular shape having a bulge corresponding to the shape of the outer peripheral surface of the bulge part 18.

It is possible that the main rubber elastic body is of a length so that it is limited to being on the outer peripheral surface of the bulge part 18 of the inner shaft member 12. In this case, a large diameter part and a small diameter part are provided in the bulge part 18 of the inner shaft member 12, and a sliding liner is arranged across the large diameter part and the small diameter part. In this way, the small diameter part is not necessarily limited to the portion axially outside from the bulge part 18 in the inner shaft member 12, and may include the axial end of the bulge part 18 that has a relatively small diameter.

In the above embodiment, an example has been shown in which the disclosure is applied to a suspension bushing for an automobile. However, the disclosure is also applicable to a sliding bushing other than a suspension bushing.

What is claimed is:

1. A sliding bushing, having a structure in which an inner shaft member and an outer tube member are connected by a main rubber elastic body and sliding of the inner shaft member with respect to the main rubber elastic body is allowed, wherein
the inner shaft member comprises a bulge part provided midway in an axial direction;
a braided cloth sliding liner is arranged between the inner shaft member and the main rubber elastic body so as to be non-adhesive and slidable with respect to the inner shaft member; and
wherein the braided cloth sliding liner comprises:
a coarse part, arranged on an outer periphery with respect to a large diameter part of the bulge part of the inner shaft member; and
a fine part, arranged on an outer periphery with respect to a small diameter part on both axial sides of the large diameter part,
wherein a stitch or weave of the coarse part has a coarse braid mesh, and a stitch or weave of the fine part has a fine braid mesh, wherein a size of the coarse braid mesh of the coarse part is larger than a size of the fine braid mesh of the fine part.

2. The sliding bushing according to claim 1, wherein a notch is formed in the coarse part of the braided cloth sliding liner.

3. The sliding bushing according to claim 1, wherein the braided cloth sliding liner is loosely braided in the coarse part.

4. The sliding bushing according to claim 1, wherein
the braided cloth sliding liner is composed of two split liners facing each other in the axial direction of the inner shaft member; and
each end on a side of the two split liners facing each other is arranged on the outer periphery of the large diameter part of the bulge part of the inner shaft member and serves as the coarse part.

5. The sliding bushing according to claim 1, wherein
the braided cloth sliding liner is arranged entirely between overlapping surfaces of the inner shaft member and the main rubber elastic body.

6. The sliding bushing according to claim 1, wherein overlapping surfaces of the inner shaft member and the main rubber elastic body extend axially outward from the braided cloth sliding liner.

7. The sliding bushing according to claim 1, wherein
the outer tube member comprises a tapered part whose diameter decreases axially outward at both axial end portions; and
a minimum inner diameter of the tapered part of the outer tube member is smaller than a maximum outer diameter of the bulge part of the inner shaft member.

8. The sliding bushing according to claim 1, wherein
on an axial end face of the main rubber elastic body, a hollow part having a concave shape opening in the axial direction is formed over an entire periphery between the inner shaft member and the outer tube member in the radial direction, and a bottom of the hollow part reaches the outer periphery of the bulge part.

* * * * *